(12) United States Patent
Dukkipati et al.

(10) Patent No.: US 11,431,644 B2
(45) Date of Patent: Aug. 30, 2022

(54) PREDICTABLE VIRTUALIZED NIC

(71) Applicant: Google LLC, Mountain View, CA (US)

(72) Inventors: Nandita Dukkipati, Menlo Park, CA (US); Nathaniel Lewis, Madison, WI (US); Praveen Kumar, Ithaca, NY (US); Yaogong Wang, Millbrae, CA (US)

(73) Assignee: Google LLC, Mountain View, CA (US)

( * ) Notice: Subject to any disclaimer, the term of this patent is extended or adjusted under 35 U.S.C. 154(b) by 128 days.

(21) Appl. No.: 16/539,639

(22) Filed: Aug. 13, 2019

(65) Prior Publication Data

US 2021/0006500 A1    Jan. 7, 2021

Related U.S. Application Data

(60) Provisional application No. 62/870,331, filed on Jul. 3, 2019.

(51) Int. Cl.
| | |
|---|---|
| *H04L 47/32* | (2022.01) |
| *G06F 9/455* | (2018.01) |
| *H04L 43/16* | (2022.01) |
| *H04L 47/12* | (2022.01) |
| *H04L 49/50* | (2022.01) |

(52) U.S. Cl.
CPC .......... *H04L 47/32* (2013.01); *G06F 9/45558* (2013.01); *H04L 43/16* (2013.01); *H04L 47/12* (2013.01); *H04L 49/501* (2013.01); *G06F 2009/45595* (2013.01)

(58) Field of Classification Search
CPC ......... H04L 47/00; H04L 47/10; H04L 47/50; H04L 47/70; H04L 47/32; H04L 43/16; H04L 47/12; H04L 49/501; G06F 9/45558; G06F 2009/45595
See application file for complete search history.

(56) References Cited

U.S. PATENT DOCUMENTS

| | | | |
|---|---|---|---|
| 9,317,310 B2* | 4/2016 | Hendel | ............... G06F 9/45533 |
| 10,645,123 B1* | 5/2020 | Vishwanathan | .... G06F 9/45558 |
| 2012/0163175 A1 | 6/2012 | Gupta | |
| 2016/0077948 A1* | 3/2016 | Goel | ..................... G06F 11/328 |
| | | | 714/47.1 |

(Continued)

OTHER PUBLICATIONS

Extended European Search Report for European Patent Application No. 20183815.8 dated Dec. 22, 2020. 11 pages.

(Continued)

*Primary Examiner* — Shukri Taha
(74) *Attorney, Agent, or Firm* — Lerner, David, Littenberg, Krumholz & Mentlik, LLP

(57) ABSTRACT

A method for controlling congestion in a datacenter network or server is described. The server includes a processor configured to host a plurality of virtual machines and an ingress engine configured to maintain a plurality of per-virtual machine queues configured to store received packets. The processor is also configured to execute a CPU-fair fair queuing process to control the processing of the packets by the processor. The processor is also configured to selectively trigger temporary packet per second packet transmission limits on top of a substantially continuously enforced bit per second transmission limit upon detection of a per virtual machine queue overload.

18 Claims, 5 Drawing Sheets

(56) References Cited

U.S. PATENT DOCUMENTS

| | | | |
|---|---|---|---|
| 2017/0149698 A1* | 5/2017 | Tsirkin | G06F 9/45558 |
| 2018/0191630 A1 | 7/2018 | Kenny et al. | |
| 2018/0276038 A1* | 9/2018 | Malik | G06F 9/4856 |
| 2019/0014055 A1* | 1/2019 | Gupta | H04L 47/50 |
| 2020/0065123 A1* | 2/2020 | Yang | G06F 9/455 |

OTHER PUBLICATIONS

Gulati, A. et al. "mClock: Handling Throughput Variability for Hypervisor IO Scheduling" In OSDI, vol. 10, pp. 1-7, Oct. 4, 2010.

Soares, P. et al. "Gatekeeper: Distributed rate control for virtualized datacenters" Technical Report HP-2010-151, HP Labs; Oct. 2010.

Yoo, S. et al. "Predictable packet latency in Xen-ARM" IEICE Transactions on Information and Systems, vol. 95, No. 11, pp. 2613-2623, Nov. 1, 2012.

Holmer et al. A Google Congestion Control Algorithm for Real-Time Communication; draft-ietf-rmcat-gcc-02.txt. Jul. 8, 2016. Internet Engineering Task Force, IETF; Standardworkingdraft, Internet Society (ISOC) 4, Rue Des Falaises CH-1205 Geneva, Switzerland, pp. 1-19.

Alvestrand. RTCP message for Receiver Estimated Maximum Bitrate; draft alvestrand-rmcat-remb-03. Oct. 21, 2013. Internet Engineering Task Force, IETF; Standardworkingdraft, Internet Society (ISOC) 4, Rue Des Falaises CH-1205 Geneva, Switzerland, pp. 1-8.

Office Action for European Patent Application No. 20183815.8 dated Apr. 20, 2022. 14 pages.

* cited by examiner

PREDICTABLE VIRTUALIZED NIC

RELATED APPLICATIONS

The present application claims priority to and the benefit of U.S. Provisional Patent Application No. 62/870,331, titled "PREDICTABLE VIRTUALIZED NIC" and filed on Jul. 3, 2019, the entire contents of which are hereby incorporated by reference for all purposes.

BACKGROUND

In a cloud computing environment, a single host or server can host multiple virtual machines on a shared computing platform. On such shared infrastructure, resources (e.g. host processor cycles, memory, and transmission and reception bandwidths) available on the infrastructure can be allocated to users, also referred to as tenants, according to service level agreements or preset policies between the tenants and the hosts. Current allocation mechanisms are inadequate or suboptimal in many circumstances, and virtualization processes currently utilized often do not allow for efficient sharing of resources because hosts typically lack visibility into tenant applications and may often compensate by over-provisioning. Therefore, an improved approach to sharing processing resources in virtualized computing environments is needed for a more efficient provisioning of cloud computing resources.

SUMMARY

Aspects of the subject technology relate to controlling congestion in a datacenter environment. At least one aspect is directed to a server. The server includes a processor configured to host a plurality of virtual machines and an ingress engine. The ingress engine is configured to maintain a plurality of per-virtual machine (per-VM) queues configured to store received packets associated with each of the respective plurality machines hosted by the processor. The processor is also configured to execute a CPU-fair fair queuing process to control the processing by the processor of the packets stored in the per-VM queues. The CPU-fair fair queuing process is configured to ensure, to the extent needed by each virtual machine, a minimum processor cycle allocation for processing packets stored in a corresponding per-VM queue. In response to detecting a threshold number of packet drops from at least one of the per virtual machine queues, the processor is also configured to trigger a packet per second transmission limit to at least one remote computing device transmitting packets to the virtual machine associated with the per virtual machine queue experiencing the packet drops.

In some implementations, the server includes a network interface card, and the ingress engine is executed on the network interface card. In some implementations, the per virtual machine queues are maintained on the network interface card. In some implementations, the processor is further configured to transmit bit per second transmission limits to at least one remote computing device transmitting packets to at least one of the virtual machines hosted by the processor.

In some implementations, the server includes a multi-core processor, and at least one core of the multi-core processor is dedicated to processing packets stored in the per-VM queues. In some implementations, processing a packet stored in a per-VM queue includes executing at least one of a plurality of network functions on the packet. The network functions can include physical address translation, decryption, or firewall processing.

In some implementations, the processor is configured to include the packet per second transmission limit transmitted to the at least one remote computing device in respective packet acknowledgement messages. In some implementations, the processor is configured to include the packet per second transmission limit transmitted to the at least one remote computing device in respective independent control packets.

In some implementations, at least one minimum processor cycle allocation for a first of the virtual machines is different than a minimum packet processor cycle allocation for a second of the virtual machines. In some implementations, the processor is configured, in response to detecting an empty per-VM queue associated with a first virtual machine, to reallocate at least a portion of the processor cycle allocation allocated to the first virtual machine to at least one other virtual machine.

At least one aspect is directed to a method of managing congestion. The method includes providing a server comprising a processor and an ingress engine. The processor is configured to host a plurality of virtual machines. The method includes maintaining, by the ingress engine, a plurality of per-VM queues configured to store received packets associated with each of respective plurality machines hosted by the processor. The method also includes executing, by the processor, a CPU-fair fair queuing process to control the processing by the processor of the packets stored in the per-VM queues, wherein the CPU-fair fair queuing process is configured to ensure, to the extent needed by each virtual machine, a minimum processor cycle allocation for processing packets stored in a corresponding per-VM queue. The method also includes in response to detecting a threshold number of packet drops from at least one of the per virtual machine queues, transmitting a packet per second transmission limit to at least one remote computing device transmitting packets to the virtual machine associated with the per virtual machine queue experiencing the packet drops.

In some implementations, the method includes providing a network interface card, wherein the ingress engine is executed on the network interface card. In some implementations, the per virtual machine queues are maintained on the network interface card.

In some implementations, the method further includes transmitting bit per second transmission limits to at least one remote computing device transmitting packets to at least one of the virtual machines hosted by the processor. In some implementations, the server comprises a multi-core processor, and at least one core of the multi-core processor is dedicated to processing packets stored in the per-VM queues. In some implementations, processing a packet stored in the per-VM queues includes executing at least one of a plurality of network functions on the packet. The network functions can include physical address translation, decryption, or firewall processing.

In some implementations, the processor is configured to include the packet per second transmission limit transmitted to the at least one remote computing device in respective packet acknowledgement messages. In some implementations, the processor is configured to include the packet per second transmission limit transmitted to the at least one remote computing device in respective independent control packets. In some implementations, at least one minimum processor cycle allocation for a first of the virtual machines is different than a minimum packet processor cycle allocation for a second of the virtual machines.

In some implementations, the method further includes in response to detecting an empty per-VM queue associated with a first virtual machine, reallocating at least a portion of the processor cycle allocation allocated to the first virtual machine to at least one other virtual machine.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
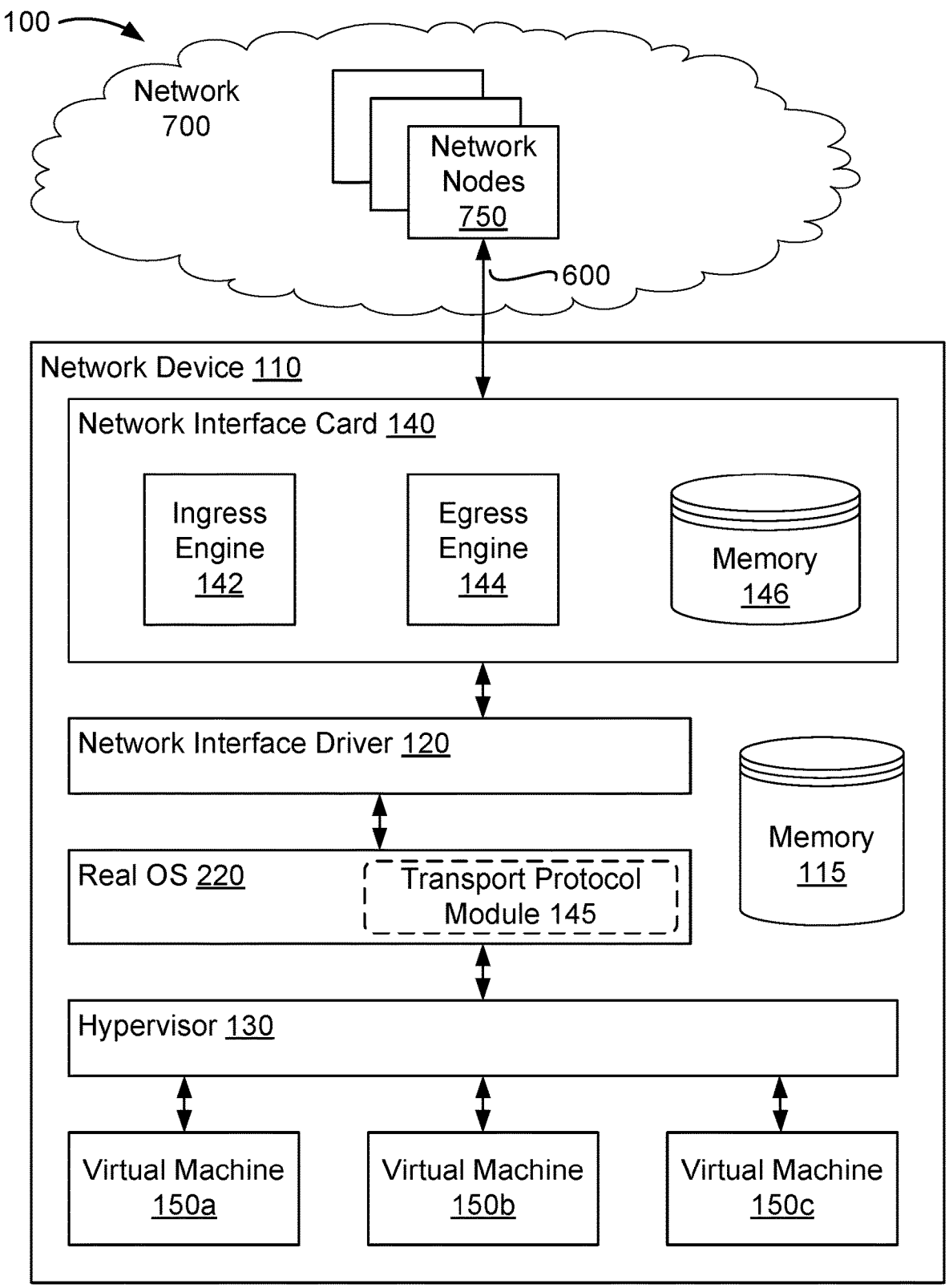
FIG. 1 is a block diagram of a network environment with a network device, according to some implementations.

The detailed description set forth below is intended as a description of various configurations of the subject technology and is not intended to represent the only configurations in which the subject technology may be practiced. The appended drawings are incorporated herein and constitute a part of the detailed description. The detailed description may include specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The technologies described herein generally relate to a method of managing congestion in network that includes virtualized computing environments, such as a datacenter network hosting cloud-based applications. A data packet is transmitted from a source to a destination in a data network. Congestion can take different forms, particularly in cloud computing contexts in which network devices handle traffic associated with multiple virtualized computing devices, either in the form of virtual machines or containerized environments. Congestion as described herein relates to delays introduced by bandwidth constraints within the source and destination network devices, as well as in the network infrastructure connecting the source and destination devices. For example, congestion can arise from delays resulting from a packet remaining in a transmission queue at a source node, or from delays in an ingress engine at the packet destination being able to process a received packet. Such processing may include guest to physical memory address translation, decryption, or the execution of other network functions that are carried out on the packet before it is transferred to the actual destination computing environment, e.g., a specific virtual machine or container executing on the destination network device. Particularly in the cloud computing environment, where a given network device may host multiple computing environments, and therefore may receive more network traffic, a greater percentage of congestion experienced in data center environments results from processing delays rather than transmission delays in comparison to computing environments in which networking devices only host individual computing environments.

When a data packet is received at a network device via a network interface card (NIC), it gets processed by an ingress engine of the NIC, which typically includes the ingress engine and an egress engine. The ingress engine handles the incoming packets while the egress engine handles outgoing packets. Upon receiving the incoming packets at the NIC, the ingress engine is configured to assign it to one of several queues for ingress processing. For virtual network environments as described herein, the queues are referred to as per-virtual machine (per-VM) queues. Each of the virtual machines is allocated a queue for packets directed to that virtual machine. The specificities of the queuing process depend in part on service level agreements or preset policies that have been determined between the users/tenants and the host/server. When allocating processing resources, e.g., CPU time or CPU cycles, the ingress engine can be configured, together with the processor of the host, to control congestion by the use of per-VM queues for the available resources. In some implementations, the processor processes the packets in the per-VM queues according to a CPU fair queuing process.

In accordance with various implementations described herein, the ingress engines and egress engines of devices on the network are configured to employ a bit per second rate control algorithm in combination with temporary packet per second rate control algorithms. The temporary packet per second rate control algorithms are triggered when there is an overflow of a queue of a specific VM queue. According to various implementations herein, the two congestion control algorithms are implemented independently. In some implementations, the bit per second rate congestion control algorithm or process is always (or substantially always) running. In such instances, a bit per second rate limit is set for each virtual machine. In some implementations, the packet per second rate congestion control algorithm or process is switched on when there is an overload in the ingress engine, for example, when the network or the destination device is congested. When overload occurs, the bit per second rate may no longer be sufficient for controlling the incoming network traffic, and as a result, some data packets may be dropped during the ingress process. This process may occur during the assigning of packets to the per-VM queues, for example, when a packet is assigned to the queue for its VM and that queue is already full and is no longer accepting any additional packets. Such a packet would be dropped, without being processed further to its intended destination VM. The technology as described herein relates to remedying the aforementioned issue by triggering a packet per second rate congestion control algorithm or process. When one or more per-VM queues can no longer accept additional packets, a notification or message is generated and sent to the source device(s) that was sending the flow of packets to the VM(s) associated with the overflowing queues. The notification may be a simple flag included in an acknowledgement message or an independent message to the particular source device(s) that are overloading the specific overflowing per-VM queue or to all source devices that are sending data packets to the destination device. According to various implementations disclosed herein, the CPU of the server can undertake the process of detecting the overload of incoming packets at the per-VM queues and notifying the source devices. In some implementations, the detection can be implemented on a processor residing in the NIC of the destination device.

FIG. 1 is a block diagram of a network environment 100 with a network device 110, according to some implementations. In broad overview, the illustrated network environment 100 includes a network 700 of interconnected network nodes 750. The network nodes 750 participate in the network 700 as data sources, data destinations (or data sinks), and/or intermediary nodes such as switches, routers, and/or gateways propagating data from sources towards destinations through the network 700. The network 700 includes the network device 110 with links 600 to various other participating network nodes 750.

Referring to FIG. 1 in more detail, the network 700 is a network facilitating interactions between participant devices. An illustrative example network 700 is the Internet; however, in other implementations, the network 700 may be another network, such as a local network within a data center, a network fabric, or any other local area or wide area network. The network 700 may be composed of multiple connected sub-networks or autonomous networks. The network 700 can be a local-area network (LAN), such as a company intranet, a metropolitan area network (MAN), a wide area network (WAN), an inter-network such as the Internet, or a peer-to-peer network; for example, an ad hoc WiFi peer-to-peer network. Any type and/or form of data network and/or communication network can be used for the network 700. It can be public, private, or a combination of public and private networks. In general, the network 700 is used to convey information between computing devices; for example, network nodes 750, and the network device 110.

As shown in FIG. 1, the network device 110 is a host device or server executing one or more virtual machines 150a, 150b, 150c (generally virtual machines 150) on one or more CPUs or multi-core processors of the network device 110. The network device 110 includes a network interface driver 120, a memory 115, a network interface card 140, a real OS 220, a hypervisor 130, and the virtual machines 150. The hypervisor 130 manages operation of the virtual machines 150, including spinning up and terminating the virtual machines 150, managing allocation of memory 115 to the virtual machines 150, and migrating the virtual machines 150 to other network devices.

The network device 110 includes the memory 115. In some implementations, the memory 115 may store computer executable instructions for a real operating system (OS) 220 and a transport protocol module 145 (such as a TCP protocol module or the TCP layer of the network stack) to be executed on a processor of the network device 110. In some implementations, the memory 115 may store computer executable instructions related to the operation and use of a network interface driver 120. In some other implementations, the memory 115 may store computer executable instructions for the hypervisor 130 to be executed on a processor of the network device 110. In some other implementations, the memory 115 may store computer executable instructions for the virtual machines 150 executing on the network device 110. In some other implementations, the memory 115 may store data for forwarding to the virtual machines 150, processing by the virtual machines 150, and/or transmission from the virtual machines 150. The memory 115 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

The network interface driver 120 can include a network interface driver software module running on a real OS. A network interface driver, such as the network interface driver 120, can be a collection of computer executable instructions stored in the memory 115 that when executed by a processor help facilitate network communications. In some other implementations, the network interface driver 120 may be implemented as logic implemented in a hardware processor or other integrated circuit, or as a combination of hardware and software logic. The network interface driver 120 can communicate with one of the software virtual machines 150 (or applications executing on the virtual machines 150), via a guest OS of a virtual machine (or in some implementations, through a hypervisor and the guest OS if operating in a virtual machine environment). In some implementations, the network interface driver 120 is included within a first layer of a transmission control protocol (TCP) stack of the real OS 220 of the network device 110 and communicates with a software module or application that is included in an upper layer of the TCP stack. In one example, the network interface driver 120 is included within a transport layer of a TCP stack and communicates with a software module or application that is included in an application layer of the TCP stack. In another example, the network interface driver 120 is included within a link layer of a TCP stack and communicates with a TCP/IP module that is included in an internet/transport layer of the TCP stack. In some implementations, the functionality is additionally or alternatively configured to receive packets from another network or transport layer protocol module, such as a user datagram protocol (UDP) module, reliable datagram protocol (RDP) module, reliable user datagram protocol (RUDP) module, or a datagram congestion control protocol (DCCP) module. In some other implementations, the network interface driver 120 can be included as a portion of the network interface card 140.

The network interface card 140 includes an ingress engine 142, an egress engine 144, and a memory 146. The ingress engine 142 and egress engine 144 can be functional blocks of one or more processors of the network interface card 140, such as an application-specific integrated circuit (ASIC) having discrete functional blocks. In some implementations, the ingress engine 142 and egress engine 144 can be functional blocks of software executing on one or more general-purpose processors of the network interface card 140. In some implementations, the functions of the ingress engine 142 and egress engine 144 can be combined or further subdivided into different functional blocks.

The memory 146 can store computer executable instructions for execution by network interface card 140, such as instructions relating to the operation of the ingress engine 142 and the egress engine 144. The memory 146 can provide for caches, buffers, translation tables, and/or time-indexed data structures used by the network interface card 140, virtual machines 150, and/or hypervisor 130 for the transmission and receipt of data packets over the network 100. For example, the memory 146 can store, for each virtual machine 150, one or more receive queues and transmit queues. In another example, the memory 146 can store tables containing translations of virtual memory addresses associated with virtual machines 150 to physical memory addresses of regions of the network device 110 in memory 118 respectively allocated to the virtual machines 150. The memory 146 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

The ingress engine 142 of the network interface card 140 is responsible for handling received packets. In some implementations, the ingress engine 142 may manage multiple receipt queues maintained in the memory 146 for storing received packets until such packets are processed by the network interface driver 120 and are passed on to a destination virtual machine 150. In some implementations, the ingress engine 142 maintains a separate queue for each virtual machine 150. In some implementations, the ingress engine 142 maintains separate queues for packets marked with having different quality of service flags. In some implementations, the ingress engine 142 executes a received packet scheduler for controlling the timing of processing of packets in the respective queues by the network interface driver 120. In some implementations, such scheduling functionality is integrated instead into the network interface driver 120.

The egress engine 144 manages the transmission of packets received by the network interface card 140 from the network interface driver 120. Such packets include both traditional data packets transmitted by applications executing the virtual machines 150, as well as control packets, such as acknowledgement packets sent to acknowledge receipt of packets, session initiation packets and session termination packets used to set up and tear down communication sessions between network devices. In some implementations, the egress engine 144 maintains multiple transmit queues within the memory 146. The queues may be associated with individual virtual machines 150 or quality of service identifiers, or shared across multiple virtual machines 150 and/or quality of service indicators. The egress engine 144 may also include a packet builder that takes data to be transmitted by the network interface card 140, breaks the data down into multiple packets, and adds any necessary header information to the packets prior to transmission. In some implementations, such packet building functionality may be implemented by the network interface driver 120 or the functionality may be split between the network interface driver 120 and the network interface card 140.

Figure 2A:
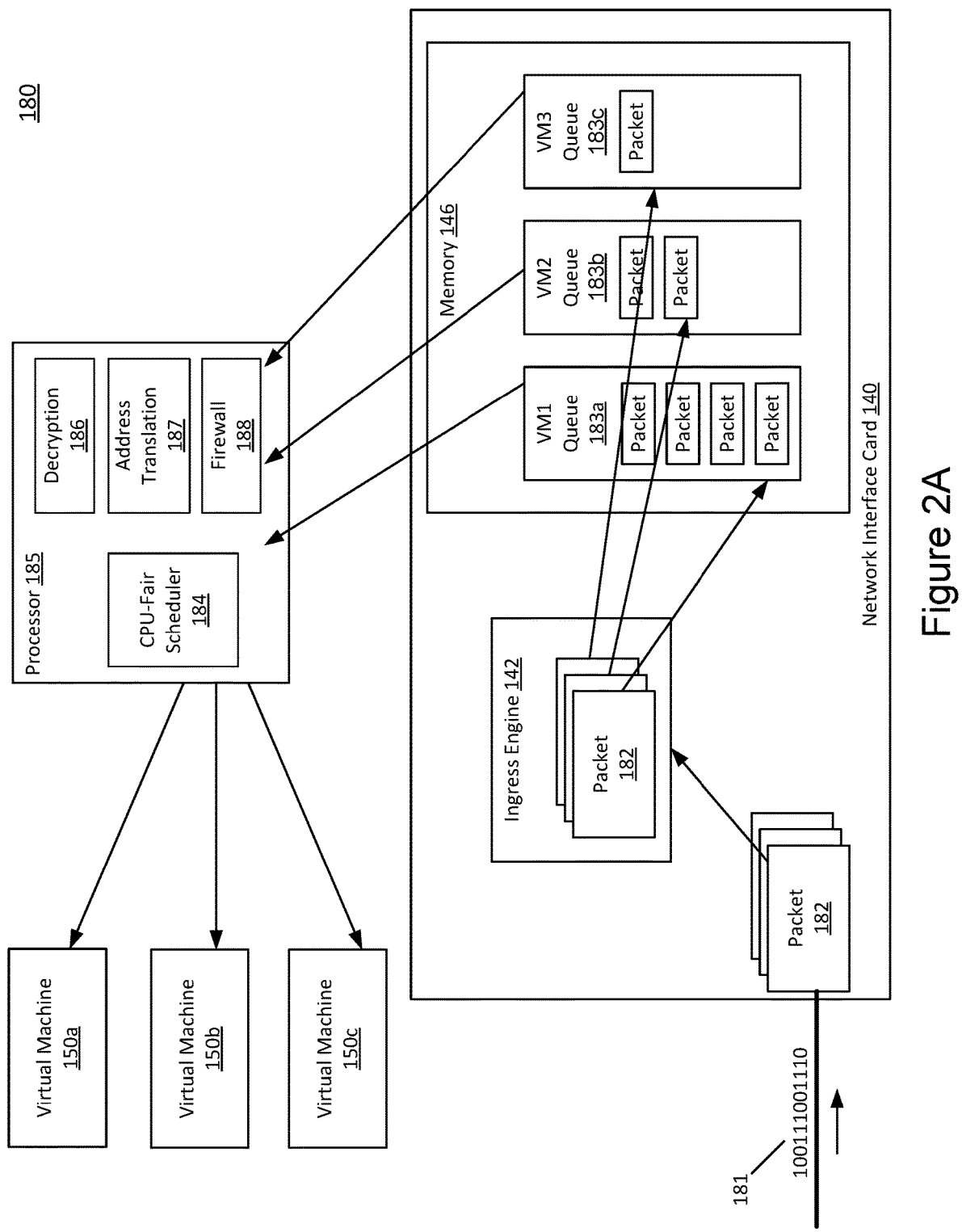
FIG. 2A is an example block diagram depicting example processing steps performed by an example network device with respect to received data packets.

FIG. 2A is an example block diagram 180 depicting example processing steps performed by an example network device 110 with respect to received data packets 182. FIG. 2A depicts certain processing performed directly by a network interface card 140 of a network device 110, as well as processing performed by the processor (and software executing thereon) of the network device 110 itself.

As shown in FIG. 2A, data packets 182 are received as a stream of bits 181 (encoded using an optical or electrical encoding scheme), which are converted into received data packets 182. The data packets are processed by the ingress engine 142 and are stored in various queues 183a, 183b, 183c (herein after referred to as "queues 183", "per-virtual machine queues 183" or "per-VM queues 183") in the memory 146 of the network interface card 140 associated with each of the virtual machines 150 executing on the network device 110. As shown in FIG. 2A, different virtual machines 150 may receive packets 182 at different rates, and therefore the queues 183 associated with the respective virtual machines 150 may have different numbers of packets stored therein. Similarly, depending on the agreements or policies implemented by the network interface driver 120 and/or ingress engine 142, packets may be removed from the respective queues 183 at different rates, which may result in further variation in the number of packets 182 stored in the queues 183. The rate at which packets 182 are processed from the respective queues 183 is controlled by a CPU-fair scheduler 184. The CPU-fair scheduler 184 is shown in FIG. 2A as a functional block (implemented e.g., as part of the network interface driver 120 executing on a processor 185 of the network device 110). However, in other implementations, the CPU-fair scheduler 184 may be implemented on the network interface card 140 as part of the ingress engine 142.

In some implementations, the packet processing rates may be set equally for each virtual machine. In some implementations, certain virtual machines 150 may be given preferential packet processing rates depending on agreements or policies between the server/host and the user/tenant. In some implementations, the packet processing rates are set based on processor cycle allocations to each virtual machine 150, as different packets require different numbers of processor cycles to be processed. The rates may be set based on a relative or absolute packet processing allocation, e.g., using a round robin or other scheduling algorithm.

In some implementations, the network device 110 or the server also includes a multi-core processor, and at least one core of the multi-core processor is dedicated to processing packets stored in the queues 183. In some implementations, when a particular virtual machine 150 experience packets dropping due to overloading, i.e., when the incoming packets exceed the preset packet processing rate or when a threshold number of packet drops is reached, the network device 110 (e.g., by the processor and/or egress engine) is configured to transmit to sources of packets being transmitted to the particular virtual machine 150 a notification, a message or a flag that a packet per second transmission limit has been reached. In some implementations, the network device 110 is configured to include the packet per second transmission limit in respective packet acknowledgement messages. In some implementations, the network device 110 is configured to include the packet per second transmission limit in respective independent control packets.

In some implementations, at least one minimum processor cycle allocation for a first of the virtual machines is different than a minimum packet processor cycle allocation for a second of the virtual machines. In some implementations, the CPU fair schedule 184 is configured, in response to detecting an empty queue 183 associated with one virtual machine 150, to reallocate at least a portion of the processor cycle allocation allocated to the one virtual machine to at least one other virtual machine.

As shown in FIG. 2A, the processor 185 is configured to execute additional network functions, including a decryption function 186, an address translation function 187, and a firewall function 188. Different packets may require different ones of these network functions to be applied, depending on the type of communication involved.

As mentioned above, the CPU-fair scheduler 184 controls the de-queuing and processing of packets 182 via a CPU-fair fair queue process, based on the number of processor cycles necessary to process the packets and the allocation of the processor cycles to the respective virtual machines. As a result, the number of packets per second each virtual machine may have processed may vary based on the specific set of network functions that are to be applied to the packets. Accordingly, for two virtual machines allocated an equal share of processing cycles, and all other things being equal, if one virtual machine requires decryption of received packets and the other does not, the virtual machine not requiring decryption may have more packets processed per second than the virtual machine requiring decryption.

Figure 2B:
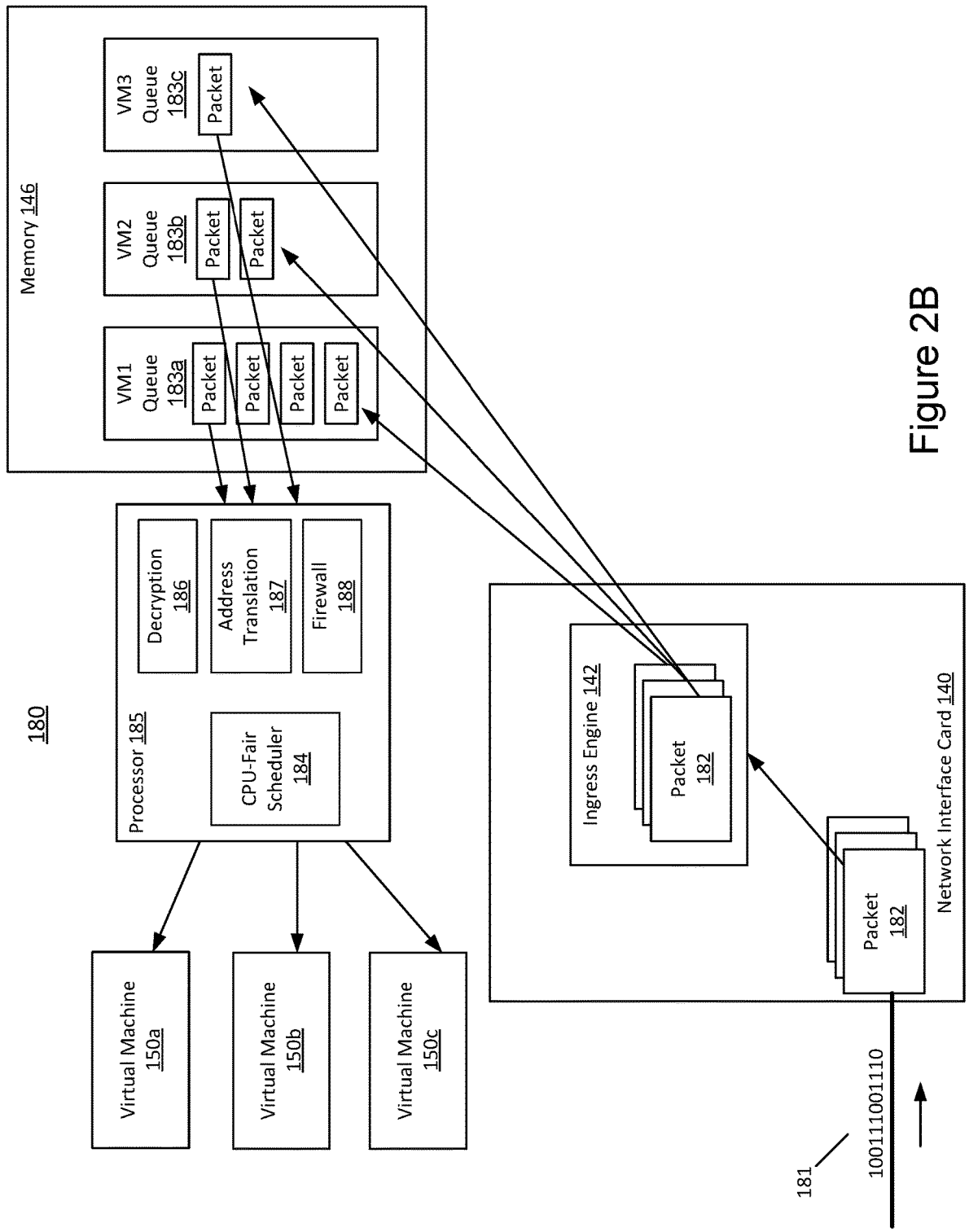
FIG. 2B is another example block diagram depicting example processing steps performed by another example network device with respect to received data packets.

FIG. 2B is another example block diagram 180 depicting example processing steps performed by an example network device 110 with respect to received data packets 182. In the implementation shown in FIG. 2B, the memory 146 storing the per-VM queues 183a-183c is located outside the network interface card 140. The memory 146 can be a stand-alone memory module or part of the main host memory 115. Accordingly, the capacity and performance of the memory 146 can be different from the memory 146 of the network configuration depicted in FIG. 2A where the memory 146 resides in the network interface card 140. Since other components and their arrangement shown in FIG. 2B are similar or substantially similar to those shown in FIG. 2A, they will not be described in further detail and can be referred to with respect to FIG. 2A, unless otherwise stated.

Figure 3:
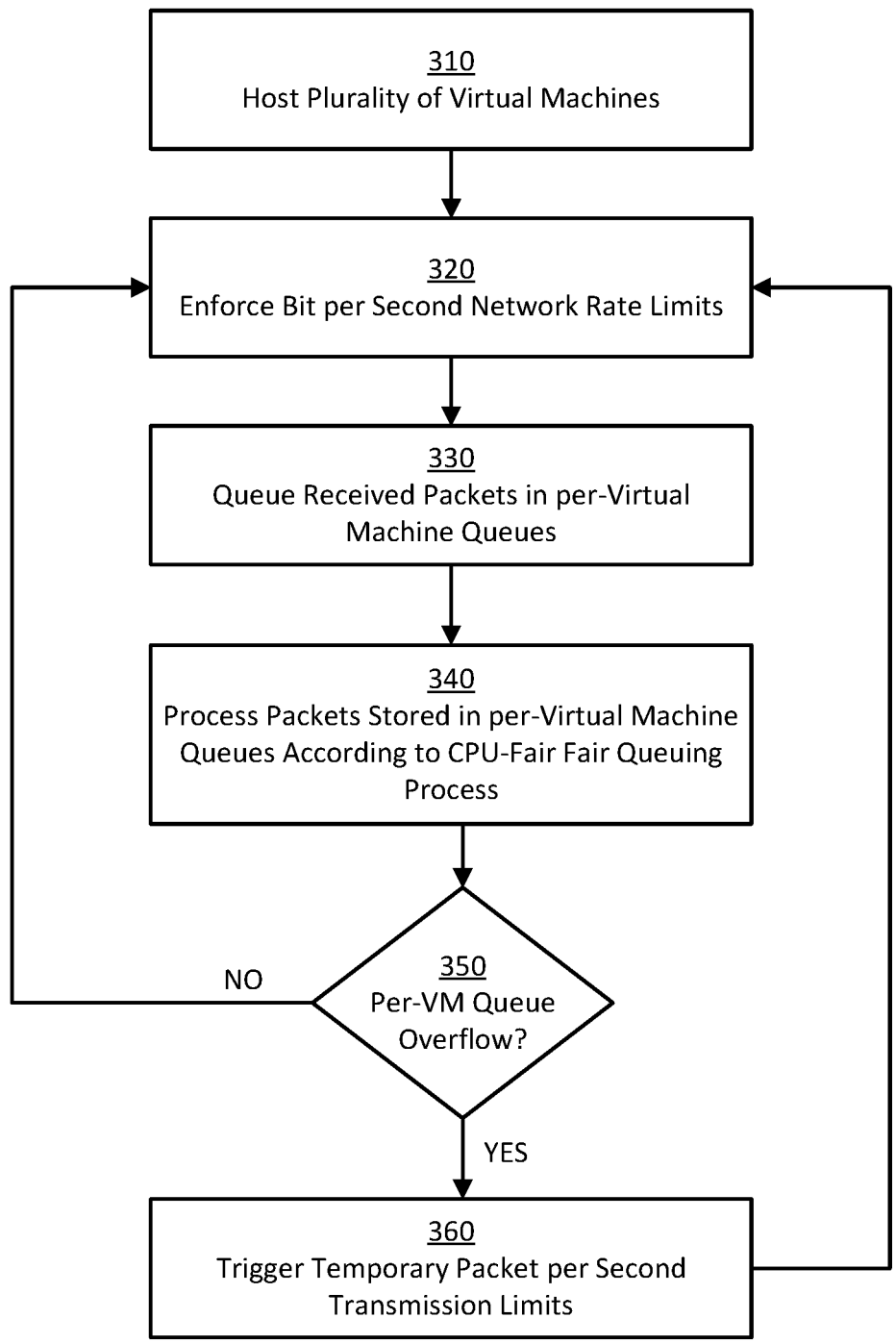
FIG. 3 is a flow chart illustrating a method for managing data transmission to a network device, according to an illustrative implementation.

FIG. 3 is a flow chart illustrating a method 300 for managing data transmission to a network device, according to an illustrative implementation. In some implementations, the method 300 can be used for managing data transmission to a network device similar to that shown in FIG. 2A or 2B. For explanatory purposes, the various blocks of the example method 300 are described herein with reference to the components and/or processes described herein. One or more of the blocks of the method 300 may be implemented, for example, by one or more components or processors of network devices 110 shown in FIG. 1. For example, the method 300 may be carried out by some combination of the network interface driver 122, ingress engine 142, and egress engine 144 of a network device 110. In some implementations, one or more of the blocks may be implemented apart from other blocks, and by one or more different processors or controllers. Further, for explanatory purposes, the blocks of the example method 300 are described as occurring serially, or linearly. However, multiple blocks of the example method 300 may occur in parallel. In addition, the blocks of the example method 300 need not be performed in the order shown and/or one or more of the blocks of the example method 300 need not be performed.

As shown in block 310 of FIG. 3, the method 300 includes hosting a plurality of virtual machines on the network device 110 shown in FIG. 1. The network device 110 or a network controller sends a bit per second transmission rate limit to remote devices that are connected to the plurality of virtual machines, informing the connected remote devices of the transmission rate limit. The method 300 further includes enforcing the bit per second network transmission rate limit, as shown in block 320. The bit per second rate limit may be set for all virtual machines or be varied for different virtual machines based on the service level agreement associated with the respective virtual machines. In some implementations, the enforcement of the bit per second network transmission rate limit is performed by the remote devices that are connected to the virtual machine upon receiving information of the rate limit from the network device 110. In some implementations, the bit per second rate limit can be enforced by the egress engine of a network interface card at the remote device. In some implementations, the ingress engine may also enforce the bit-per-second rate limit by dropping received packets for which the transmission of such packets exceeded the bit-per-second rate limit (e.g., if the remote device violated the rate limit). In some implementations, the specific rate bit per second network transmission rate limit depends on the number of connections that are currently connected to the specific virtual machine. For example, if only one remote device is connected to the virtual machine, the remote device can utilize up to the entire preset bit per second transmission rate limit. If the number of connected remote devices increase to, for example, 5, the transmission rate limit per remote device may be reduced to a fraction of the total bit per second transmission rate limit that has been agreed to in the service level agreement.

Upon receiving incoming packets, the ingress engine 142 queues the received packets to corresponding per-virtual machine (per-VM) queues, as shown in block 330 based on the destination of the packet. The queued packets are processed according to a CPU-fair fair queuing process at block 340. The method 300 also includes detecting an overflow of packets in a per-VM queue, as shown in block 350. If no overflow of a queue is detected, the method includes continuing to receive the incoming packets at or below the bit per second transmission rate limit enforced by the remote device and/or the ingress engine. If an overflow of a queue is detected, the method includes detecting a threshold number of packet drops from at least one of the per-VM queues. In some implementations, the threshold number of packet drops can range from a pre-determined number of packet drops per second, per hundreds of microseconds, per tens of microseconds, or per microseconds. In some implementations, the threshold number of packet drops can range from a pre-determined number of packet drops within a period of 1 microsecond, 10 microseconds, 100 microseconds, 1 second, 10 seconds, 100 seconds, and the like.

Figure 4:
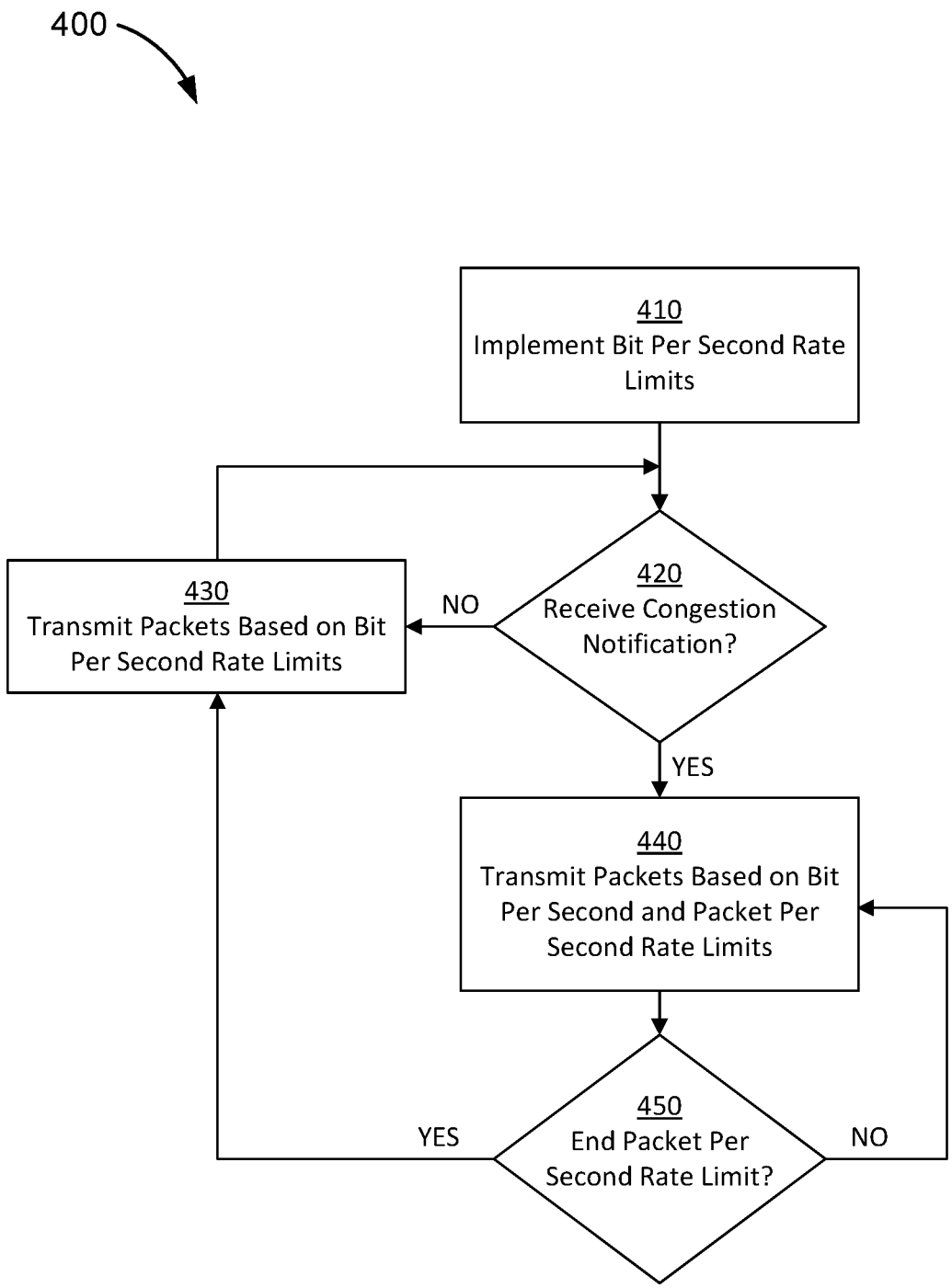
FIG. 4 is another flow chart illustrating a method for managing data transmission on a remote device, according to an illustrative implementation.

In response to detecting a per-VM queue overflow exceeding the overflow threshold, the method 300 includes triggering a temporary packet per second transmission rate limit, as shown in block 360. The triggering of packet per second transmission rate limit occurs when the network device 110 sends out a congestion notification, message or a flag to the remote devices that are sending packets to the virtual machine that is associated with the overloaded per-VM queue experiencing the packet drops. The congestion notification may include for example a temporary packet per second transmission rate limit that the remote devices are required to adhere to in transmitting packets to the virtual machine. At this stage, the remote devices follow both the bit per second transmission rate limit and the packet per second transmission rate limit; the remote devices operate under both limits until the temporary packet per second rate limit requirement is lifted. FIG. 4 discusses various methods for lifting the packet per second rate limit.

FIG. 4 is another flow chart illustrating a method 400 for managing data transmission on a remote device, according to an illustrative implementation. In particular, the flow chart of FIG. 4 illustrates the process flow of the method 400 executing on an egress engine of the remote device. As shown in block 410 of FIG. 4, the method 400 includes implementing the bit per second transmission rate limit at the egress engine of the remote device when sending outgoing packets to a virtual machine on the network device 110. In some implementations, the method 400 includes a receiving a congestion notification, as shown in block 420. The egress engine transmits packets using the bit per second transmission rate limit until it receives a congestion notification. If it does not receive a congestion notification that one of the queues at the ingress engine of the network device 110 is overflowing, the egress engine continues transmitting packets using the bit per second transmission rate limit, as shown in block 430.

When the congestion notification is triggered or received, the egress engine of the remote device transmits packets at both the bit per second network transmission rate limit and the packet per second network transmission rate limit, as shown in block 440. In some implementations, the notification includes the packet per second rate limit a data value (e.g., an index value) that identifies which of several packet per second rate limits to apply. In some implementations, the egress engine is configured with a default packet per second rate limit to apply upon receipt of the congestion notification. In some implementations, the egress engine is configured with a default packet per second rate limit, which it applies unless the notification includes instructions to apply a different packet per second rate limit. In some implementations, the method 400 determines whether the packet per second rate limit can be ended, as shown in block 450. If the packet per second rate limit is still imposed, the egress engine of the remote device continues transmitting packets under both rate limits. If the packet per second limit is no longer applicable, the egress engine of the remote device can return to transmitting packets under only the bit per second transmission rate limit.

In some implementations, the imposing of the packet per second rate limit can be ended if pre-determined amount of time (e.g., a system configured time limit) has lapsed. In some implementations, the time limit is indicated in the congestion notification itself. For example, the congestion notification may include instructions to transmit under a temporary packet per second transmission rate limit for a duration of 30 milliseconds. In this instance, the remote device may operate under both the bit per second and packet per second rate limits for 30 milliseconds, after which the device returns to operating under only the bit per second transmission rate limit. In some implementations, the imposition of the packet per second rate limit is ended if an additional notification is received that the packet per second transmission rate limit is no longer to be applied. That is, the remote device may operate under both rate limits until a notification to do otherwise is received.

The methodologies described herein may be implemented by various means depending upon the application. For example, these methodologies may be implemented in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A server comprising:
   a processor configured to execute a plurality of virtual machines;
   an ingress engine configured to:
      maintain a plurality of per-virtual machine queues configured to store received packets associated with each of the plurality of virtual machines executed by the processor;
   wherein the processor is further configured to:
      execute a CPU-fair fair queuing process to control the processing by the processor of the packets stored in the per-virtual machine queues, wherein in executing the CPU-fair fair queuing process, the processor is configured to ensure, to the extent needed by each virtual machine, a minimum processor cycle allocation for processing packets stored in a corresponding per-virtual machine queue;
      transmit bit per second transmission limits to at least one remote computing device transmitting packets to at least one of the virtual machines executed by the processor; and
      in response to detecting a threshold number of packet drops from at least one of the plurality of per-virtual machine queues, transmit a packet per second transmission limit to the at least one remote computing device experiencing the packet drops.

2. The server of claim 1, comprising a network interface card, and the ingress engine is executed on the network interface card.

3. The server of claim 2, wherein the plurality of per-virtual machine queues are maintained on the network interface card.

4. The server of claim 1, wherein the server comprises a multi-core processor, and at least one core of the multi-core processor is dedicated to processing packets stored in the plurality of per-virtual machine queues.

5. The server of claim 1, wherein processing a packet stored in the plurality of per-virtual machine queues comprises executing at least one of a plurality of network functions on the packet, the network functions comprising: physical address translation, decryption, and firewall processing.

6. The server of claim 1, wherein the processor is configured to include the packet per second transmission limit transmitted to the at least one remote computing device in respective packet acknowledgement messages.

7. The server of claim 1, wherein the processor is configured to include the packet per second transmission limit transmitted to the at least one remote computing device in respective independent control packets.

8. The server of claim 1, wherein at least one minimum processor cycle allocation for a first virtual machine of the plurality of virtual machines is different than a minimum packet processor cycle allocation for a second virtual machine of the plurality of virtual machines.

9. The server of claim 1, wherein the processor is configured, in response to detecting an empty per-virtual machine queue associated with a first virtual machine of the plurality of virtual machines, to reallocate at least a portion of the processor cycle allocation allocated to the first virtual machine to at least one other virtual machine of the plurality of virtual machines.

10. A method of managing congestion, comprising:
    providing a server comprising a processor and an ingress engine, the processor configured to execute a plurality of virtual machines;
    maintaining, by the ingress engine, a plurality of per-virtual machine queues configured to store received packets associated with each of the plurality of virtual machines executed by the processor;
    executing, by the processor, a CPU-fair fair queuing process to control the processing by the processor of the packets stored in the plurality of per-virtual machine queues, wherein in executing the CPU-fair fair queuing process, the processor is configured to ensure, to the extent needed by each virtual machine, a minimum processor cycle allocation for processing packets stored in a corresponding per-virtual machine queue;
    transmitting bit per second transmission limits to at least one remote computing device transmitting packets to at least one of the virtual machines executed by the processor; and
    in response to detecting a threshold number of packet drops from at least one of the plurality of per-virtual machine queues, transmitting, by the processor, a packet per second transmission limit to the at least one remote computing device experiencing the packet drops.

11. The method of claim 10, comprising:
    providing a network interface card, wherein the ingress engine is executed on the network interface card.

12. The method of claim 11, wherein the plurality of per-virtual machine queues are maintained on the network interface card.

13. The method of claim 10, wherein the server comprises a multi-core processor, and at least one core of the multi-core processor is dedicated to processing packets stored in the plurality of per-virtual machine queues.

14. The method of claim 10, wherein processing a packet stored in the plurality of per-virtual machine queues comprises executing at least one of a plurality of network functions on the packet, the network functions comprising: physical address translation, decryption, and firewall processing.

15. The method of claim 10, wherein the processor is configured to include the packet per second transmission limit transmitted to the at least one remote computing device in respective packet acknowledgement messages.

16. The method of claim 10, wherein the processor is configured to include the packet per second transmission limit transmitted to the at least one remote computing device in respective independent control packets.

17. The method of claim 10, wherein at least one minimum processor cycle allocation for a first virtual machine of the plurality of virtual machines is different than a minimum packet processor cycle allocation for a second virtual machine of the plurality of virtual machines.

18. The method of claim 10, comprising:
- in response to detecting an empty per-virtual machine queue associated with a first virtual machine, reallocating, by the processor, at least a portion of the processor cycle allocation allocated to the first virtual machine to at least one other virtual machine of the plurality of virtual machines.

* * * * *